United States Patent [19]

Brown

[11] Patent Number: 5,012,608
[45] Date of Patent: May 7, 1991

[54] SPRAY BOOM

[76] Inventor: Philip A. Brown, 4689 8 Mile Rd., NW., Conklin, Mich. 49403

[21] Appl. No.: 391,491

[22] Filed: Aug. 9, 1989

[51] Int. Cl.$^5$ .................... A01C 00/00; A01G 00/00
[52] U.S. Cl. ........................................ 47/1.7; 239/159; 239/175
[58] Field of Search ............... 239/169, 175, 161, 163; 47/1.7, 159

[56] References Cited

U.S. PATENT DOCUMENTS

| | | | |
|---|---|---|---|
| 3,927,832 | 12/1975 | Robinson | 239/169 |
| 4,215,758 | 8/1980 | Jones | 239/159 |
| 4,288,034 | 9/1981 | Widmer | 239/159 |
| 4,427,154 | 1/1984 | Mercill | 239/161 |
| 4,521,988 | 6/1985 | Thacker | 47/1.7 |
| 4,646,971 | 3/1987 | Rogers | 47/1.7 |
| 4,660,762 | 4/1987 | Spillman | 47/1.7 |
| 4,834,249 | 5/1989 | Dahl | 239/175 |
| 4,873,788 | 10/1989 | Viramontes | 47/1.7 |

FOREIGN PATENT DOCUMENTS

| | | | |
|---|---|---|---|
| 2480626 | 10/1981 | France | 239/166 |
| 1165259 | 7/1985 | U.S.S.R. | 47/1.7 |

Primary Examiner—Henry E. Raduazo
Attorney, Agent, or Firm—Waters & Morse

[57] ABSTRACT

This spray boom is provided with nozzles delivering spray under a shield that confines the spray to a downward-rearward direction. The boom is mounted on a conventional tractor with a freedom to swing upward and to the rear on accidental contact with an obstruction. The boom can also be elevated for transport. The outer section of the boom is yieldable and can swing back separately on contact with a tree trunk, and this outer section is also provided with a resilient whip extension to lay down grass and weeds between trees.

10 Claims, 4 Drawing Sheets

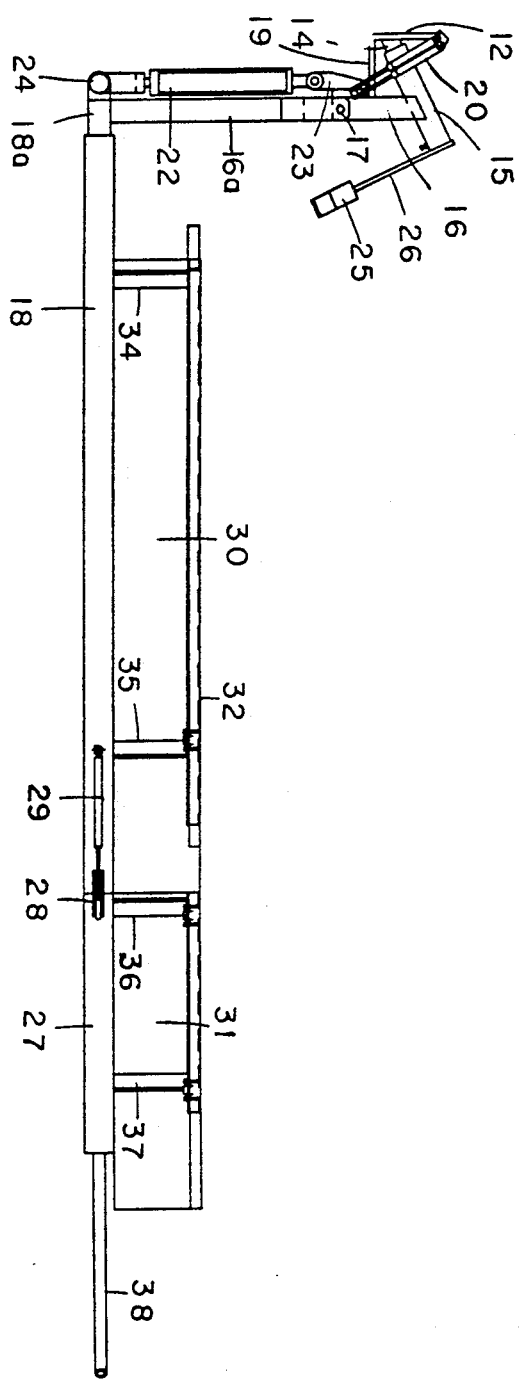
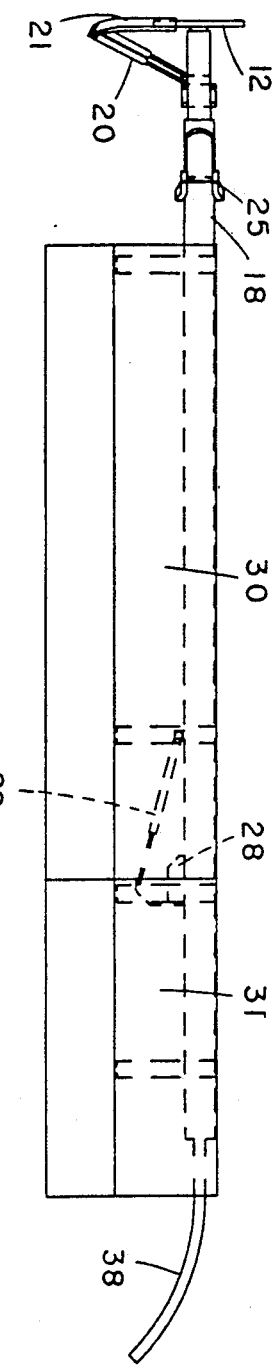
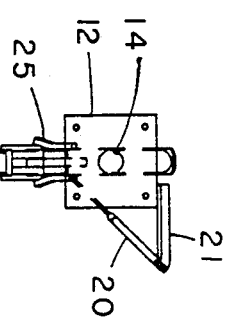

SPRAY BOOM

BACKGROUND OF THE INVENTION

This invention has been developed primarily for spraying the ground in orchard areas to control weed growth. Agricultural operations on both fields and orchards have involved delivering ground spray from nozzles mounted on booms carried by standard tractors. This system has been difficult to use in orchards, due to the necessity to avoid damaging the trunks and branches of the trees by accidental physical contact, and also by the need to avoid spraying the low-hanging branches, leaves, and fruit. Exposing these to weed-control solutions could cause extensive damage.

SUMMARY OF THE INVENTION

This spray boom is mounted on a tractor with a mechanism that permits the boom to be elevated to vertical position by an actuator, and also allows the boom to swing rearward and upward on accidental contact with an obstruction. The boom delivers the spray under a shield that confines the spray to a downward and rearward direction, and lays down the grass and weeds to expose them to the spray from the roots upward. The outer extremity of the boom, including the shield, is pivoted to swing to the rear independently against biasing action in response to collision with a tree trunk.

DESCRIPTION OF THE DRAWINGS

FIG. 6 is a view from the tractor side of the machine, showing the structure attached to the tractor.

FIG. 7 is a rear elevation of the boom in the extended position.

FIG. 8 is a top view with respect to FIG. 7.

DESCRIPTION OF THE PREFERRED EMBODIMENTS

Figure 3:
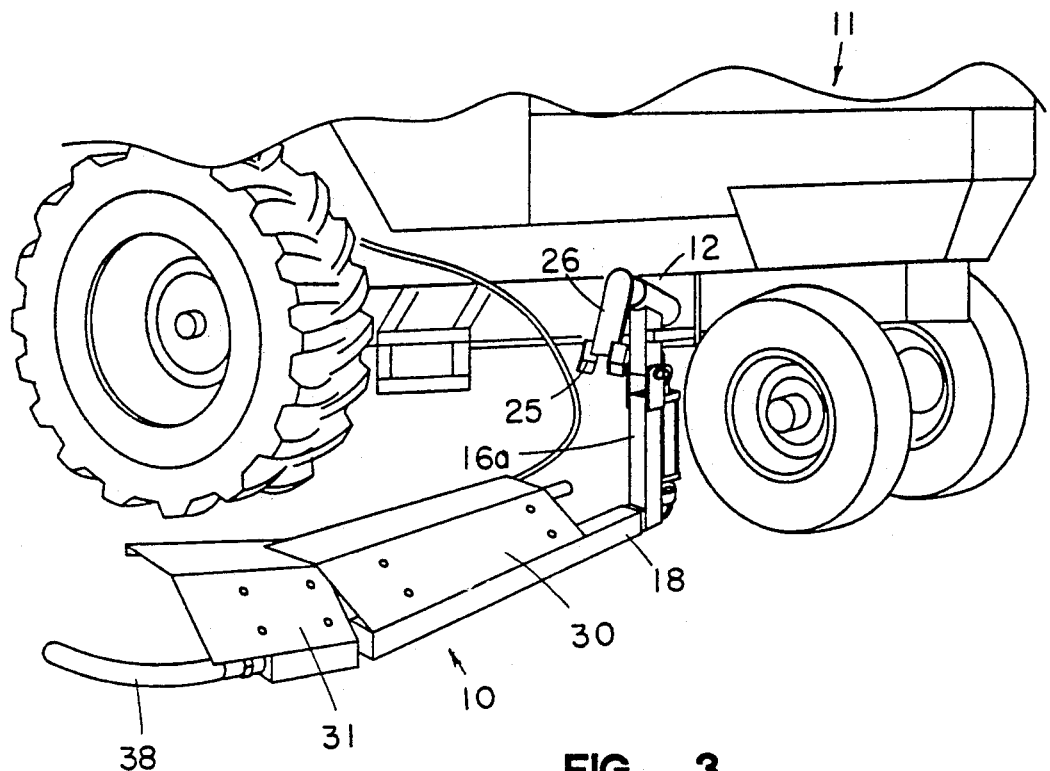
FIG. 3 is a view similar to FIG. 2, but showing the outer extremity of the boom in the deflected condition.
Figure 4:
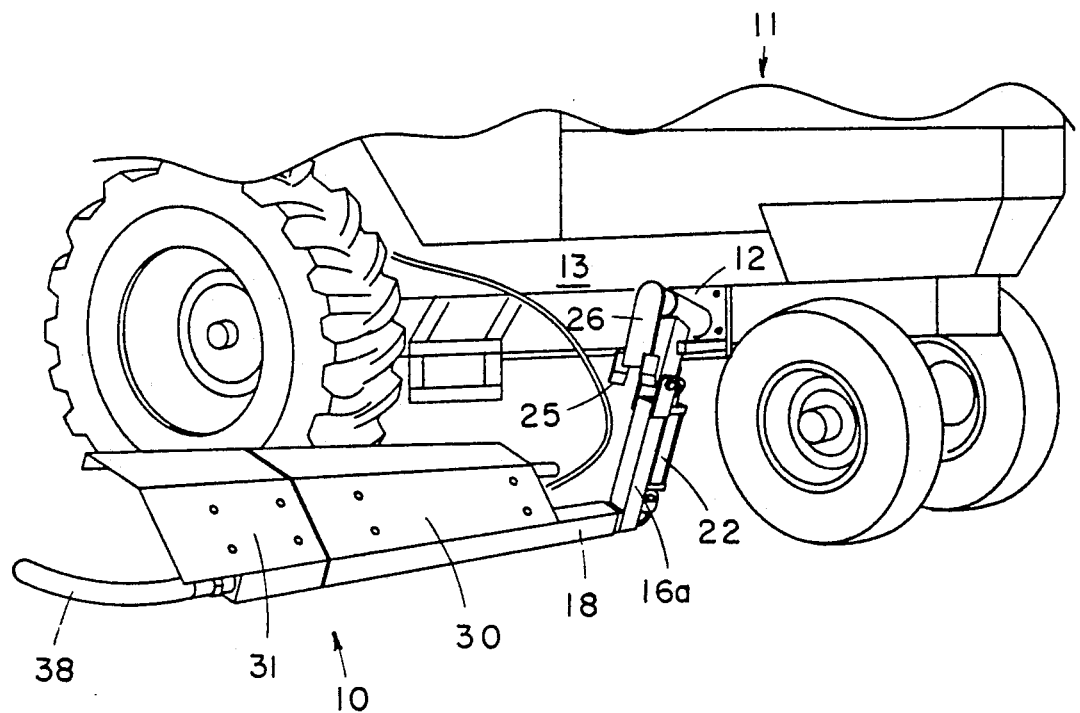
FIG. 4 is also a view similar to FIG. 2, but showing the entire boom in a position swung slightly rearward and upward from the normal operating position.

Referring to the drawings, the spray boom assembly generally indicated at 10 is shown installed on a standard tractor 11. The base plate 12 of the mounting mechanism is shown bolted to the side of the tractor frame 13. Suitable holes in this member are to be drilled for this purpose. Where the tractor frame is higher than it should be for the best operation of the boom, an auxiliary extension plate is provided which is bolted to the frame, and extends downward to the desired position for the attachment of the base plate 12. This auxiliary mounting plate is not shown in the drawings.

Figure 1:
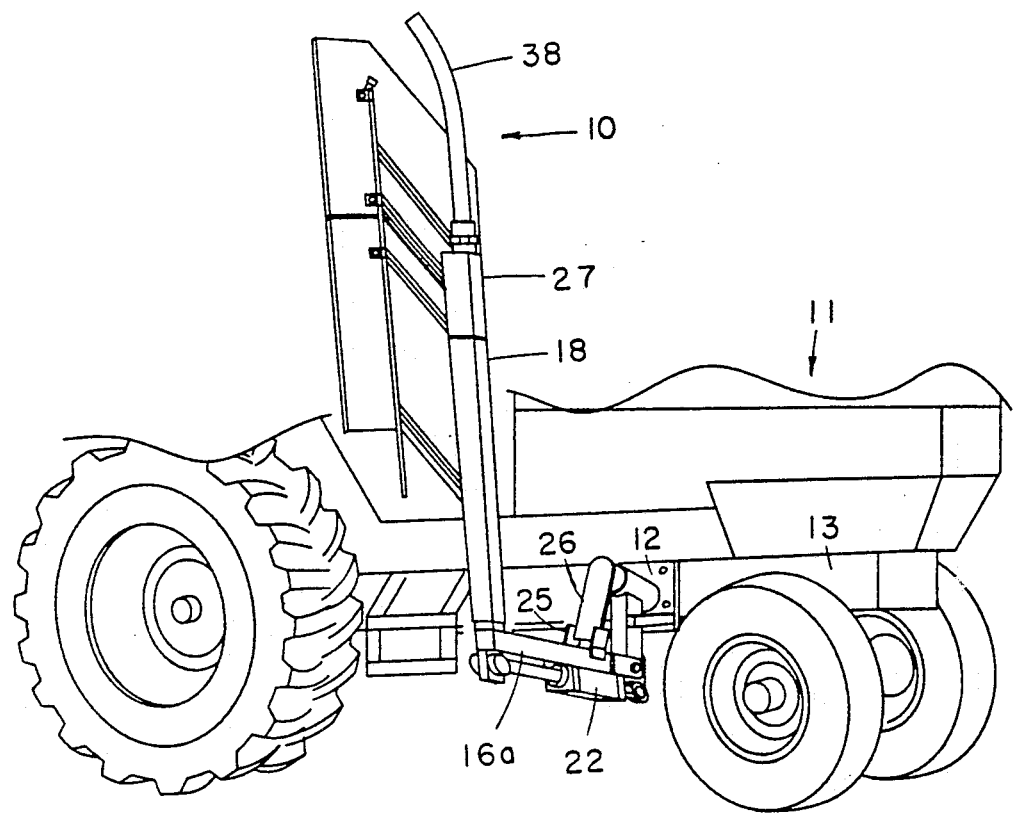
FIG. 1 is a front perspective view showing the spray boom mounted on a standard tractor, and carried in the elevated position used when the boom is not in use.
Figure 2:
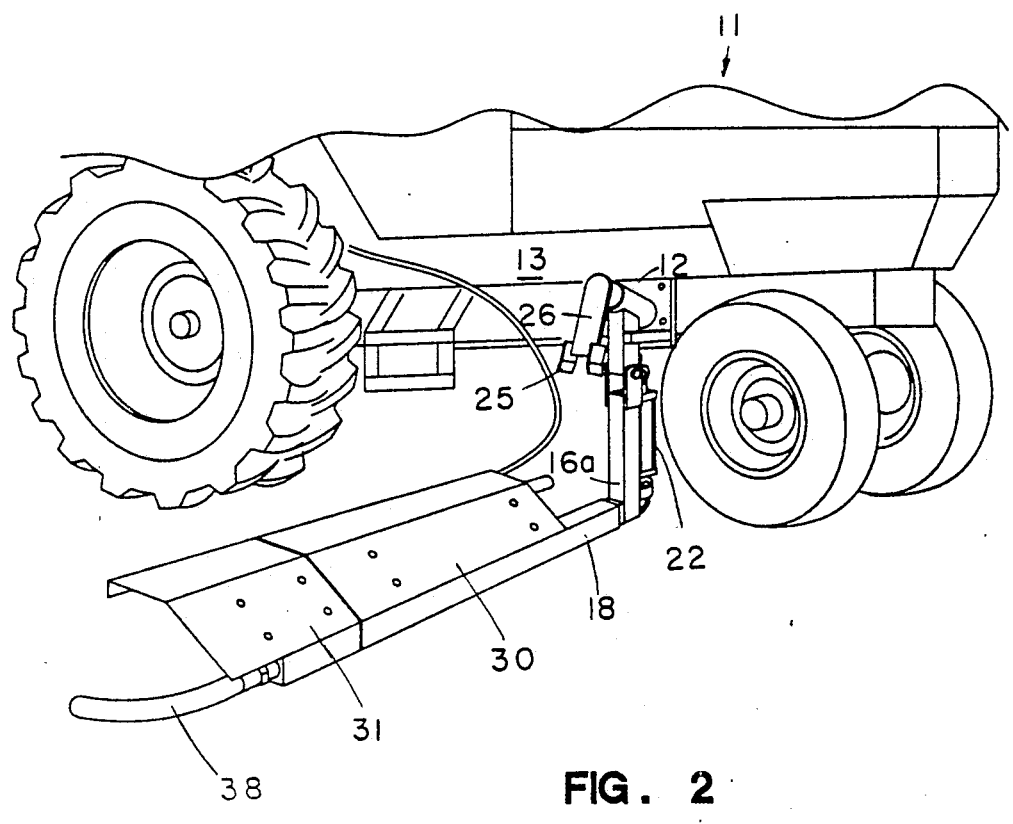
FIG. 2 is a view from a similar position, showing the boom in the lowered, or operating position.

The details of the mounting mechanism are best shown in FIG. 7, and in FIGS. 6 and 8 related to it. A pivot shaft 14 is welded to the base plate 12 to form a pivot bracket on an axis at an angle to the horizontal such that the entire boom assembly can swing upward and to the rear upon encountering an obstacle. A sleeve 15 is pivotally received on the pivot shaft 14, and carries the normally vertical arm 16, also with a welded connection. This arm extends downward to provide a pivot connection 17 for the lower section 16a welded to the inner section 18a of the telescoping beam 18, the principal structural member of the boom. The telescoping relationship permits the boom to be accommodated to various tractors. An abutment 19 welded to the base plate 12 limits the rotation of the assembly about the pivot shaft 14 to establish the position shown in FIG. 7, against the biasing action of the linear shock-absorber members 20 which have a structure similar to that of an ordinary spring-loaded door closer. These devices act between a suitable bracket secured to the vertical arm 16 and the extension arm 21 (See FIG. 6) welded to the base plate 12. The actuator 22 acts between the bracket 23 secured to the arm 16 and the pivot connection 24 on the beam 18. As the actuator 22 is extended, the boom assembly rotates in a counter clockwise direction as in FIG. 7, with a rotation continuing until the arm section 16a engages the fork receptacle 25 welded to the arm 26, which is secured to the outer extremity of the sleeve 15. This engagement with the fork 25 tends to stabilize the elevated position of the boom shown in FIG. 1, so that accidental contact of the boom with overhanging branches will not unduly twist the structure of the mounting mechanism.

Figure 5:
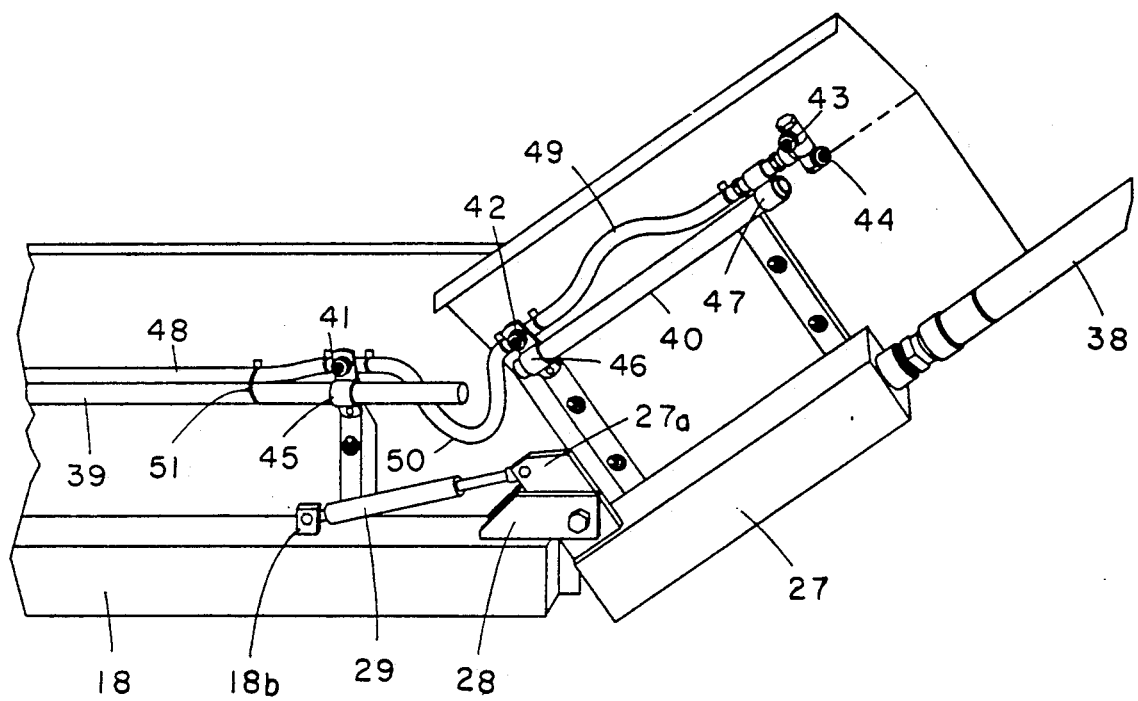
FIG. 5 is a perspective view on an enlarged scale from underneath the outer portion of the boom, showing the deflected condition of the outer extremity.

The boom structure includes an outer section 27 of the beam 18, these two elements being pivotally connected at 28. A spring-loaded cylinder 29 (also similar in construction to a door closer) extends between the bracket 27a on the outer section 27 and a suitable bracket 18b on the inner section (See FIG. 5) 18 to establish a biasing action toward the extended position shown in FIG. 8. An inner shield plate 30 and an outer shield plate 31 are secured to the beam 18 and the outer beam 27, respectively. These plates extend upwardly and to the rear, and have rearward and generally horizontal extensions as shown at 32 in FIG. 6 to confine the spray from nozzles mounted along the shields at the junction of the incline and horizontal portions as indicated at 33. The boom is operated at a level selected to deflect grass and weeds to fully expose them to the spray. The standard hose connections associating these nozzles with a tank carried by the tractor, and also a pumping system, are not shown in full. Reinforcement arms as shown at 34–37 extend from the beams 18 and 27 to maintain the position of the shields. A resilient "whip" 38 is secured to the outer extremity of the beam section 27. The whip 38 can be provided by a convenient length of hose similar in size and stiffness to wire-reinforced hydrant hose. The whip serves to lay down the grass between the trees, beyond the reach of the boom, so that all of the area subject to the action of the spray boom is treated from the roots upward. Preferably, the outer nozzle is directed in this area. FIG. 5 illustrates the preferred arrangement for mounting the nozzles on the boom structure. Mounting bars 39 and 40 are respectively secured to the reinforcement members 34–37, and the nozzles indicated at 41–44 in FIG. 5 are secured to the mounting bars by clips as shown at 45–47. The hose sections 48, 49, and 50 are thus secured at their opposite ends, which may be supplemented by ties as shown at 51.

I claim:

1. A spray boom for attachment to a standard farm tractor, comprising:
   a boom carrying a spray means;
   a pivot bracket adapted to be secured to a tractor, said spray boom having a horizontal axis extending laterally of the tractor, and said pivot bracket having a pivot axis which is inclined to said horizontal axis, said boom being secured to said bracket below said pivot axes.

2. A spray boom as defined in claim 1, wherein said boom is additionally pivotally connected with respect to said tractor about a front-rear axis.

3. A spray boom as defined in claim 2, additionally including actuating means for positioning said boom about said front-rear axis.

4. A spray boom as defined in claim 3, additionally including receptacle means on said bracket adapted to engage a portion of said boom in an elevated position thereof.

5. A spray boom as defined in claim 1, wherein said bracket has a shaft extending laterally, and includes a member having bearing means receiving said shaft, and further including biasing means urging said member downward and forward against limit stop means mounted on said bracket.

6. A spray boom as defined in claim 5, wherein said shaft is inclined both laterally and upward from said bracket.

7. A spray boom as defined in claim 5, wherein said biasing means is a linear shock-absorber device.

8. A spray boom as defined in claim 1, wherein an outer portion of said boom is pivotally connected to an inner portion thereof on a vertical axis, and also including biasing means urging said outer portion to extended position.

9. A spray boom as defined in claim 8, additionally including shield means extending over said spray means.

10. A spray boom as defined in claim 8 wherein inner and outer boom portion are provided with separated shield means.

* * * * *